United States Patent

[11] 3,610,385

| [72] | Inventor | Hans Dolata<br>Neustadt, Germany |
| --- | --- | --- |
| [21] | Appl. No. | 12,061 |
| [22] | Filed | Feb. 17, 1970 |
| [45] | Patented | Oct. 5, 1971 |
| [73] | Assignee | Andreas Stihl Maschinenfabrik<br>Neustadt, Germany |
| [32] | Priority | Feb. 18, 1969 |
| [33] | | Germany |
| [31] | | G 69 06 243 |

[54] MOTOR CHAIN SAW
11 Claims, 4 Drawing Figs.

| [52] | U.S. Cl. | 192/115 |
| --- | --- | --- |
| [51] | Int. Cl. | F16d 13/68 |
| [50] | Field of Search | 192/107 T,<br>105 CD, 115; 188/218 R; 74/230.1 |

[56] References Cited
UNITED STATES PATENTS

| 2,762,484 | 9/1956 | Hare | 192/105 C-1 |
| --- | --- | --- | --- |
| 3,329,245 | 7/1967 | Freber | 192/105 C-1 |

FOREIGN PATENTS

| 380,277 | 10/1931 | Great Britain | 188/218 |

*Primary Examiner*—Mark M. Newman
*Assistant Examiner*—Randall Heald
*Attorney*—Walter Becker

ABSTRACT: A clutch drum, especially for motor chain saws, which is composed of a drum body and a hub body and in which the hub body partially extends into the drum body through a corresponding opening thereof and is connected to the drum body by upset riveting, the drum body and the hub body having oppositely located face areas with interengaging elevations and depressions, while that portion of the hub body which is remote from the elevation and depression-equipped portion of the hub body is pivoted with a splined surface for receiving a sprocket wheel for a motor chain saw.

PATENTED OCT 5 1971　3,610,385

Inventor:
Hans Dolata
By

MOTOR CHAIN SAW

The present invention relates to a motor chain saw with a driving sprocket wheel for a saw chain which wheel has its hub in the direction of rotation in positive engagement with the drum of a clutch provided between the driving sprocket wheel and the motor, said driving sprocket wheel being axially displaceably mounted with regard to the drum.

A motor chain saw of this type has become known according to which the driving sprocket wheel in the form of a disc is mounted on a sleevelike extension of the clutch drum for displacement in axial direction, while the sleevelike extension forms one single integral piece with the clutch drum so that the manufacture of the clutch drum is difficult and expensive.

Figure 1:
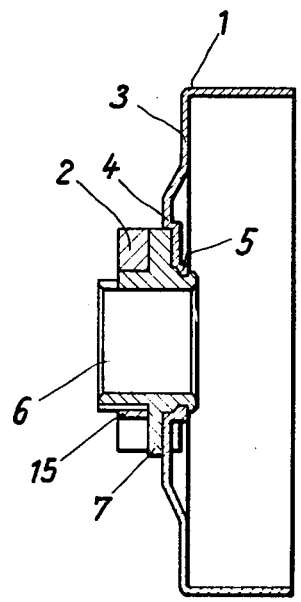

It is, therefore, an object of the present invention to provide an arrangement in which an axial displaceable connection of the driving sprocket wheel with the clutch drum can be realized. This object and other objects and advantages of the invention will appear more clearly from the following specification in connection with the accompanying drawing, in which:

FIG. 1 represents an axial section through the clutch drum of a motor driven chain saw according to the invention.

Figure 2:
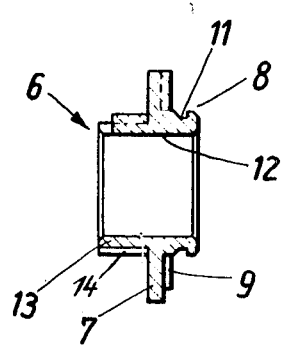

FIG. 2 shown as axial section through the drum hub of the clutch drum according to FIG. 1.

Figure 3:
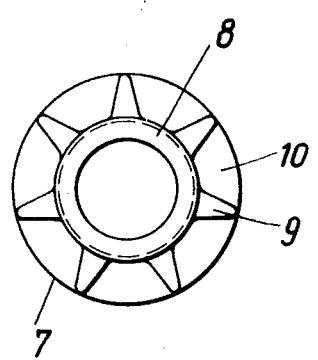

FIG. 3 illustrates the drum hub according to FIG. 2 as seen from the right-hand side of the drawing.

Figure 4:
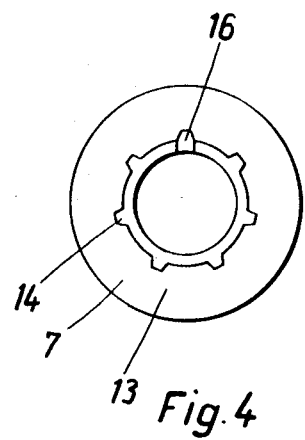

FIG. 4 is a view of the drum hub according to FIG. 2 as seen from the left-hand side of the drawing. With a motor chain saw provided with a driving sprocket wheel for a saw chain which wheel in the direction of rotation has its hub positively connected to the drum of a clutch between the driving sprocket wheel and the motor while being axially displaceable relative to the drum, the clutch drum is, in conformity with the present invention, by upset riveting nondetachably connected to a drum hub and is positively secured in its direction of rotation against axial displacement. Moreover, in conformity with the present invention, the driving sprocket wheel is with a formed-on sprocket wheel hub axially displaceably mounted on the drum hub. In this way, in spite of the fact that the arrangement can be produced in a simple manner, and extremely safe connection between the clutch drum and the drum hub is obtained which is play-free even after a longer period of use, and the driving sprocket wheel is axially displaceable so that the said wheel will be able to align itself with regard to the guiding rail or the like of the motor chain saw.

According to a preferred embodiment of the invention, the clutch drum is by means of a collar extending toward the interior of the drum mounted on the drum hub which has that portion thereof which engages the drum provided with a plurality of gear-shaped extensions which are evenly distributed over the circumference, and has a circumferential groove. The drum hub is pressed into the bore containing wall of the collar until it is stopped or until the extensions are for a positive engagement with each other pressed into the interior annular zone of the wall of the drum. The gear-shaped extensions of the drum hub will thus, when mounting the clutch drum, automatically press themselves into their engaging recesses provided in the interior annular zone of the clutch drum so that these engaging recesses precisely correspond to the shape of the gear contoured extensions. Consequently, in the direction of rotation, a play-free positive connection is obtained which is able to convey a high torque.

For purposes of obtaining in axial direction a play-free positive connection between the drum hub and the clutch drum, the collar of the clutch drum is in its axial direction shortened by upsetting, and the material which forms the collar is in the direction toward the axis of the drum hub driven into the groove of the latter.

According to a further feature of the invention, the extensions of the drum hub on that end face which faces away from the drum are limited by an abutment so that the drum hub is able to precisely align itself with regard to the clutch drum during the upset riveting operation. Expediently, the abutment is formed by a preferably disc-shaped collar of the drum hub while the extensions protrude beyond the end face of the collar. The abutment collar is particularly effective when it has the same outer diameter as the extensions.

According to a still further feature of the invention, that side of the extensions which faces the drum is provided with a hub portion which protrudes in axial direction. This hub portion is provided with a circumferential groove so that already in response to relatively low-pressure forces the upsetting of the drum collar can be effected. In order to assure small dimensions of the hub, the protruding hub portion has an outer diameter which is shorter than the outer extensions and which preferably corresponds to the inner diameter of the extensions.

That side of the collar which faces away from the extensions is expediently provided with slide guiding means for the sprocket wheel so that sprocket wheel will axially abut the collar. The slide guiding means may in a simple manner be formed by a splinelike circumferential toothed portion of a protruding hub portion which may have approximately the same outer diameter as the other hub portion.

A further simplication with regard to the manufacture of the arrangement according to the invention can be obtained when the drum hub is formed as a drop forged part and/or the clutch drum is deep drawn.

Referring now to the drawing in detail, the arrangement shown in FIG. 1 nearly corresponds to an embodiment of actual size. A motor chain saw driven by an internal combustion engine has, in conformity with the present invention, its crank case provided with a guiding rail for a saw chain. The driving force of the motor is conveyed to the saw chain through the intervention of an automatic centrifugal clutch which is coaxial with the crankshaft. The outer clutch drum 1 of said centrifugal clutch is nonrotatably connected to a driving sprocket wheel 2. The clutch drum 1 is deep drawn of a steel sheet, for instance, of a steel sheet having a thickness of 2 mm. The disc surface of the drum which is formed by two annular zones stepped with regard to each other, namely an outer annular zone 3 and an inner annular zone 4, has a central collar 5 which extends toward the interior of the drum and which is intended for connecting the drum to a drum hub 6.

The drum hub 6 is produced as a fine or fine cast part of chrome nickel steel and the like and has an eccentric disc-shaped protruding circumferential collar 7. This collar 7 has that end face thereof which faces toward the side of the shorter axially protruding hub portion 8 provided with seven circumferentially uniformly distributed formed-on teeth 9 the thickness of which is less than the thickness of the collar 7. The tooth-shaped extensions 9 are, in conformity with FIG. 3, arranged in a starlike manner and taper toward their outer ends while the outer diameter of the teeth 9 equals the outer diameter of the collar 7. Between the teeth 9 are formed tooth spaces 10 which are wider than the teeth 9 and which are defined by two adjacent teeth 9 and at the end faces by the abutment collar 7 so that the tooth spaces 10 form a type of chamber. The inner diameter of the tooth spaces or recesses 10 corresponds to the outer diameter of the shorter protruding hub portion 8.

Somewhat symmetrically located with regard to the length bisectrix of the axially protruding hub portion 8 there is in the latter provided a circumferential groove 11 having that sidewall thereof which is adjacent to the teeth 9 inclined toward the outside.

For purposes of connecting the clutch drum 1 to the drum hub 6, the latter has its shorter axially protruding hub portion 8 first driven into the collar 5 until the end faces of the teeth or ribs 9 abut the still plane inner annular zone 4 of the drum 1. Thereupon, for instance, by means of a nonillustrated tubular punch, there is exerted a considerable axial upsetting pressure upon that end face of collar 7 which faces away from the extensions 9. In views of this upsetting pressure, the tooth-shaped extensions 9 are pressed into the wall of the inner annular zone 5 of the clutch drum 1 until the collar 7 and, more specifically, its corresponding end face abuts the outer end face of the inner annular zone 4 of the clutch drum 1. The wall thickness of the clutch drum 1 will be substantially retained while following this upsetting operation, the extensions 9 will positively engage the inner annular zone 4 of the clutch drum 1. At the same time with this upsetting operation, likewise for instance by means of a tubular punch, a considerable upsetting pressure is exerted upon the inner end face of the collar 5 of drum 1 so that collar 5 will be driven into the annular groove 11 of hub 6 while undergoing an axial reduction. In this way a positive connection in axial direction is obtained between the clutch drum 1 and the drum hub 6. In view of the contact of the hub collar 7 with the clutch drum 1, a precise perpendicular location of the axis of the hub bore 12 will be obtained with regard to the end face of the drum so that a completely pay-free or beat-free rotation of the clutch drum 1 and the driving sprocket wheel 2 will be assured.

That side of the disc-shaped collar 7 of the drum hub 6 which faces away from the axially protruding hub portion 8 has a further axially protruding hub portion 13 which is longer than the hub portion 8. The outer diameter of said longer axially protruding hub portion 13 corresponds to the outer diameter of the hub portion 8. Hub portion 13 has its circumference provided with a splined shaftlike axial toothed arrangement 14 for engagement with corresponding inner teeth of the disc-shaped sprocket wheel 2. The inner part 15 of sprocket wheel 2 forms the hub 15 of the sprocket wheel 2 which hub 15 is positively connected to hub 6 for rotation but is axially displaceable on hub 6. The axial extension of the sprocket wheel 2 is less than that of the hub portion 13 so that the sprocket wheel part 15 can be displaced axially relative to the clutch drum 1 by the difference between the axial extension of the sprocket wheel 2 and that of the hub portion 13. One end position is determined by that end face of collar 7 which faces said sprocket wheel 2. The other end face of the hub portion 13 is provided with a slotlike axial groove 16 which is symmetrically located between two teeth of the splined shaft arrangement 14.

It is of course, to be understood that the present invention is, by no means, limited to the particular showing in the drawing but also comprises any modifications within the scope of the appended claims.

What I claim is:

1. A clutch drum, especially for motor chain saws, which includes: a hollow drum body having one side provided with end face wall means integral with said drum body and provided with a substantially central opening therethrough, and a hub body with a substantially outer cylindrical surface substantially coaxial with said drum body and provided with a first section and a second section, said first section extending through said opening of said end face wall means and being provided with circumferential groove means firmly engaged by the inner peripheral portion of said end face wall means so as to positively prevent said hub body from moving axial relative to said drum body, said second section being adapted axially displaceably to receive a sprocket wheel while preventing the latter from rotating about said hub body, said hub body and said end face wall means being provided with interengaging elevations and depressions for positively and firmly connecting each other for rotating as a unit.

2. A clutch drum, especially for motor chain saws, which includes: a hollow drum body having one side provided with end face wall means integral with said drum body and provided with a substantially central opening therethrough, said end face wall means having its outwardly facing side provided with depressions and elevations, and a hub body with a substantially outer cylindrical surface substantially coaxial with said drum body and provided with a flange extending radially outwardly from said outer cylindrical surface and dividing the same into a first and second section, said first section extending through said opening of said end face wall means and being provided with circumferential groove means firmly engaged by the inner peripheral portion of said end face wall means so as to positively prevent said hub body from moving axial relative to said drum body, said second surface section being splined for axially displaceably receiving a correspondingly splined sprocket wheel while preventing the latter from rotating around said hub body, that side of said flange which faces said end face wall means being provided with elevations and depressions firmly in close contact engaging said depressions and elevations of said end face wall means of said drum body so that said hub body and said drum body are positively and firmly connected to each other for rotation as a unit.

3. A clutch drum according to claim 1, in which the wall thickness of the clutch drum body in the area of the elevations is approximately equal to the adjacent wall thickness of the clutch drum body.

4. A clutch drum according to claim 2, in which the outer diameter of said flange approximately equals the outer diameter of said elevations and depressions.

5. A clutch drum according to claim 2, in which said elevations and depressions have a thickness less than said flange.

6. A clutch drum according to claim 2, in which a portion of the end face wall means engages the respective adjacent face side of said flange.

7. A clutch drum according to claim 2, in which the elevations on said flange taper in radially outward direction and in which the depressions on said flange taper in radially inward direction, said last mentioned depressions having a width considerably greater than the width of said last mentioned elevations.

8. A clutch drum according to claim 2, in which said circumferential groove means has a diameter which is less than the outer diameter of said elevations and depressions in said hub body.

9. A clutch drum according to claim 1, in which said second section is provided with guiding means for slidably and guidingly receiving a sprocket wheel.

10 A clutch drum according to claim 2, in which said first and second sections have approximately the same diameter, and in which said second section is axially longer than said first section.

11. A clutch drum according to claim 1, in which said hub body is a high quality cast member, and in which said drum body is a deep drawn member.